July 18, 1950
H. W. SCHULZE
2,515,427
CONTROL FOR ELECTRIC RANGES
Filed Oct. 4, 1947
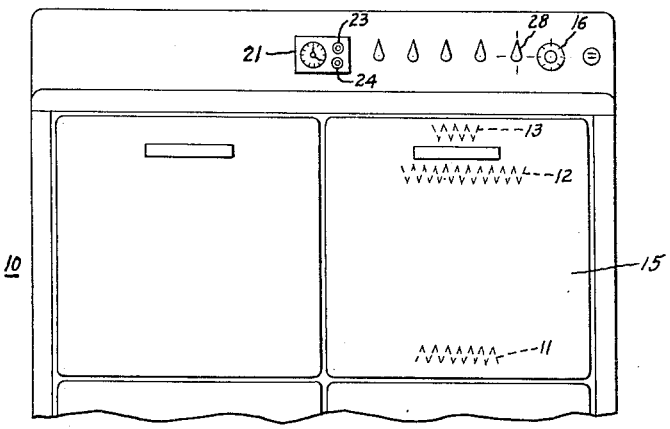
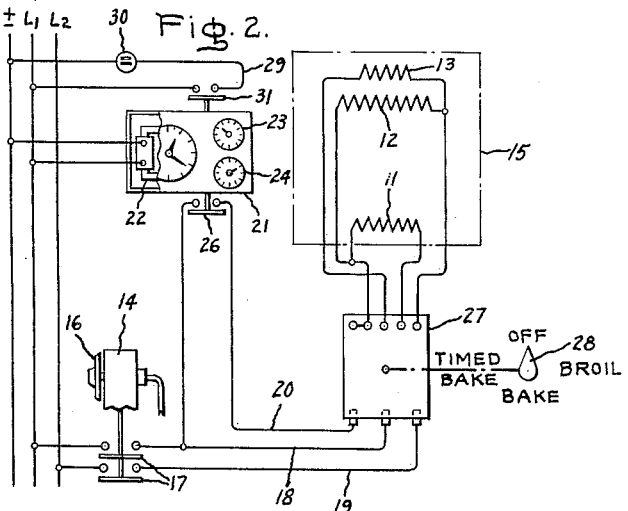
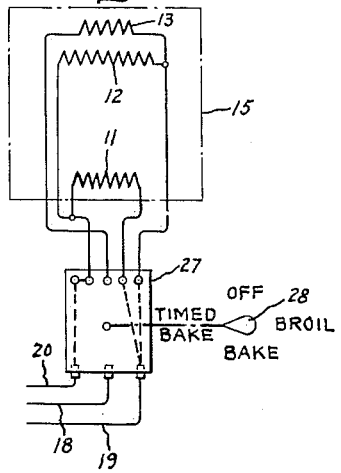
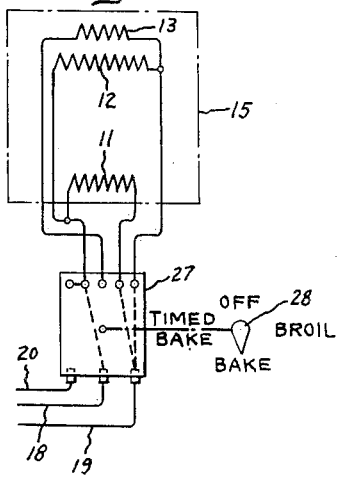
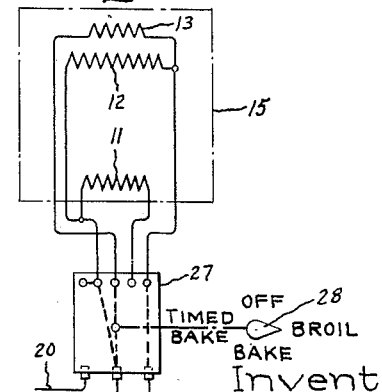
Inventor:
Herman W. Schulze,
by Alfred E. Pobst.
His Attorney.

Patented July 18, 1950

2,515,427

UNITED STATES PATENT OFFICE 2,515,427

CONTROL FOR ELECTRIC RANGES

Herman W. Schulze, Elmwood Park, Ill., assignor to Hotpoint Inc., Chicago, Ill., a corporation of New York Application October 4, 1947, Serial No. 777,997

3 Claims. (Cl. 219—20)

My invention relates to controls for electric cooking appliances. It is expressly designed to simplify the manufacture and use of timed circuit controls for electric ovens and to obviate certain inconveniences in the operation of these controls.

In the past, it has been customary to provide electric ranges, and particularly ovens of such ranges, with thermo-sensitive controls which automatically hold the heat within desired maximum and minimum points, by opening or closing the heater circuit in response to changing temperature. In addition to this, known ranges have been provided with an electrically or mechanically driven timer. When desired, this timer can be set to close the heater circuit at any given time and to open the heater circuit at a later time so that cooking can be carried out fully automatically in the absence of an operator.

However, in these prior devices, it has been customary to provide at least two independently operated switches to take care of the various controls and their operation explained above. Thus, if it was desired to use the heater with only manual control after the completion of an automatic cooking cycle in which the timer had been used, it was necessary to reset the timer to a special position or to throw a selector switch from "automatic" to "non-automatic" position, and then to operate another switch before the heater would be energized. As a result, the user often failed to reset the timer or to switch the heater to "non-automatic" position, and in subsequent use the heater was not energized even though the manual control switch was turned on. This was so, because the timer contacts remained open after completion of the timed cooking cycle.

Some attempts have been made to cure this difficulty, but so far none has been entirely satisfactory. The principal object of this invention is to arrange the heater circuits and controls so that operation of a single control handle or switch will serve to place the heater circuit on or off the timer, or to interrupt the heater circuit entirely, at the option of the user. This will insure the desired functioning of the cooking appliance through a single operation.

For a more complete understanding of this invention, reference should be had to the accompanying drawing, in which Fig. 1 is a partial elevation of a type of range embodying my invention; Fig. 2 exemplifies a wiring diagram according to my invention, with the switch and the circuit controls all in the "off" position; Fig. 3 is a diagram showing the switch and the circuit controls in the "timed bake" position; Fig. 4 is a similar diagram with the switch and the circuit controls in the normal "bake" position; and Fig. 5 is a diagram showing the switch and the circuit controls in the "broil" position.

As shown in Fig. 1, an electric range 10 is provided with an oven 15, in which are heaters which are illustrated in the form of resistance elements 11, 12 and 13. The elements 11 and 12 are connected for baking, and elements 12 and 13 are connected for broiling. Power to the range generally is provided by supply line $L^1$, $L^2$, and a neutral line.

It is usual to provide a temperature control for the oven, which I have illustrated as a thermostatic switch 14 having an operating dial or knob 16. The thermostatic switch operates under the influence of a thermoresponsive element (not shown) which is located within the oven. When temperature in the oven rises above the dial setting, the thermostatic switch operates to open the contacts 17 and interrupts the circuit to the oven. When the temperature of the oven drops below a desired point, the thermostatic switch closes the circuit. No detailed description of this thermostatic control is given because such controls are well known.

In order to carry the power to the oven, I provide a main oven heater circuit with wires 18 and 19. These are connected from the power supply to the oven heater units in a manner to be later described. For automatic timing of the cooking operation, a separate timed circuit 20 is provided. I have shown this as a by-pass of the single leg 18 of the main oven heater circuit. It is obvious that both legs of the main circuit might be included in this by-pass, at the expense of added wiring. In effect, the timer circuit is independent of the main circuit.

The timed circuit is controlled by a timer 21, which may be of any desired type. United States Patent No. 1,522,988, granted on January 13, 1925, to Henry E. Warren, shows one type of time switch which might be used. The timer is driven by clockwork, shown here as an electric clock with motor 22 connected to the neutral and one side of the power line. A mechanical clockwork could be used, if preferred.

In order to control the start and stop of the automatic timed cooking cycle, the timer is provided with the usual "on" and "off" dials 23 and 24 which are set so that the timer will operate to close and open the switch contacts 26 and 31 mechanically at selected time intervals.

Operation of the oven through either the main circuit or the timed circuit is controlled manually by a multiple-position, multiple-pole switch 27 which has a handle or knob 28. For obvious reasons, this control switch might consist of several separate units, all moved simultaneously by a single handle, or it might be a single switch, as indicated in the diagram. One type of construction which has been adapted for use in the present combination is that shown in United States Patent No. 2,203,236, granted on June 4, 1940, to Charles P. Randolph et al. Rotary disk or drum switches and other types of selector switches are usable in this combination as long as they have the requisite number of positions of the handle, and the proper circuit and contact connections. I have illustrated a four-position switch with connections so that (Fig. 2) all of the contacts are broken or opened in one position, (Fig. 3) the circuit through the timer and to the oven heaters is closed in a second position, and (Fig. 4) the circuit directly to the heaters without the timer is closed in a third position. The fourth position, illustrated in Fig. 5, shows connections completed to the heating elements used for broiling.

Before proceeding to a description of the operation of the device, it should be noted that the timer may also control one or more additional circuits, such as 29, in which is an appliance receptacle 30, or it might be a hot plate. Contacts 31 provide timing of the circuit 29 from the timer in the same fashion as do the contacts 26 in the oven timer circuit 20.

In operation of the oven, assuming that the main controller switch is in the "off" position of Fig. 2, I shall suppose that the operator wishes to start the oven for a thermostatically controlled and timed cooking cycle. This is accomplished first by setting the thermostat 16 to the desired temperature, secondly by setting the timer for the starting and stopping time points desired, and thirdly by simply turning the single knob 28 to the "timed bake" position of Fig. 3. The thermostat controls the oven temperature after the timer has started operation of the oven. Upon completion of the cycle, the timer opens the contacts 26 and the oven remains off, although the handle 28 remains in the "timed bake" position. As can be seen by tracing the circuits of Fig. 3, the heating elements 11 and 12 are used in this timed baking cycle.

Again, I shall suppose that the operator desires to perform a second timed baking operation. It is necessary only to set the thermostat and the timer to the desired time points and automatic operation will commence and cease as previously described, the manual control being already in "timed bake" position.

But suppose that non-automatic cooking is desired, i. e., without the timing cycle. Assuming that the thermostat is set properly, all that the operator has to do is to throw the knob 28 to the "bake" position of Fig. 4 from any one of the three other positions of this knob. There is no need to reset the timer or to throw a special selector switch. The baking will take place with current passing through the heat elements 11 and 12.

Or I shall suppose that it is desired to broil something in the oven. The only operation necessary is to turn the knob 28 to the "broil" position of Fig. 5, in which case the heating elements 12 and 13 will be energized. It is usual in broiling to adjust the thermostat to its highest setting in order to take maximum advantage of the radiant heat from the top element of the oven. Again, no special adjustment of the timer or of a selector switch is necessary.

Naturally, the control knob 28 will be turned to the "off" position whenever cooking is not desired.

It will thus be seen that in the "timed bake" position, the timer 21 is connected in the oven circuit 20. In the regular "bake" position or in the "broil" position, when timed operation is not desired, the timer contacts 26 are short circuited or by-passed by operation of a single handle or switch 27.

While I have shown and described a particular embodiment of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. A control for an electrically heated oven having a baking and a broiling element, comprising a main circuit to said heater and to said element, an effectively independent timer circuit to said heater, a time controlled switch in said timer circuit and being movable mechanically to close and to open said timer circuit at preselected time intervals, a manually operated circuit controller in both of said circuits, and a single operating handle for said controller, said controller being movable by said handle to four individual operating positions, in a first of said positions said controller opens both said circuits to said baking heater and to said broiling element, in a second of said positions said controller closes said main circuit to said baking heater and opens said main circuit to said broiling element and opens said timer circuit to said baking heater, in a third of said positions said controller opens said main circuit to said baking heater and to said broiling element and closes said timer circuit to said baking heater, and in a fourth of said positions said controller opens said main circuit to said baking heater and closes said main circuit to said broiling element and opens said timer circuit to said baking heater.

2. The combination, with an electric baking heater and a separate electric broiling heater for a range oven, of a single multiple-pole multiple-position control switch with circuit connections to both of said heaters, a thermally controlled power supply, a main circuit from said power supply to said control switch, a by-pass circuit from said power supply to said control switch, a time controlled switch in said by-pass circuit movable mechanically to close and to open said by-pass circuit at preselected time intervals, manual operating means for said control switch and said control switch being movable by said means to four individual operating positions, the first of said positions breaking all connections from said power supply circuits to said heaters, the second of said positions establishing connection between said main circuit and said broiling heater, the third of said positions establishing connection between said main circuit and said baking heater, and the fourth of said positions establishing connection between said by-pass circuit and said baking heater.

3. In combination with an electrically heated oven having first and second heating elements disposed adjacent to the top thereof and a third heating element disposed adjacent to the bottom thereof, a control network comprising a main circuit to said first and second and third heating elements, an effectively independent timer circuit to said second and third heating elements, a time controlled switch in said timer circuit and being movable mechanically to close and to open said timer circuit at preselected time intervals, a manually operated circuit controller in both of said circuits, and a single operating handle for said circuit controller, said controller being movable by said handle to four individual operating positions, in a first of said positions said circuit controller opens said main circuit to said first and second and third heating elements and opens said timer circuit to said second and third heating elements, in a second of said positions said circuit controller opens said main circuit to said first heating element and closes said main circuit to said second and third heating elements and opens said timer circuit to said second and third heating elements, in a third of said positions said circuit controller opens said main circuit to said first and second and third heating elements and closes said timer circuit to said second and third heating elements, in a fourth of said positions said circuit controller closes said main circuit to said first and second heating elements and opens said main circuit to said third heating element and opens said timer circuit to said second and third heating elements.

HERMAN W. SCHULZE.

REFERENCES CITED

The following references are of record in the file of this patent:

UNITED STATES PATENTS

| Number | Name | Date |
|---|---|---|
| 1,495,045 | Rankin | May 20, 1924 |
| 1,745,420 | Hewitt | Feb. 4, 1930 |
| 2,116,787 | Hart | May 10, 1938 |
| 2,268,737 | Brown | Jan. 6, 1942 |
| 2,327,632 | Frazier | Aug. 24, 1943 |
| 2,392,166 | Lockwood | Jan. 1, 1946 |
| 2,430,194 | Snyder | Nov. 4, 1947 |
| 2,450,287 | MacIntyre | Sept. 28, 1948 |
| 2,483,526 | Candor | Oct. 9, 1949 |

Certificate of Correction

Patent No. 2,515,427 July 18, 1950

HERMAN W. SCHULZE

It is hereby certified that error appears in the printed specification of the above numbered patent requiring correction as follows:

Column 4, line 28, after the word "baking" read *heater*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*